Patented Oct. 3, 1950

2,524,577

UNITED STATES PATENT OFFICE 2,524,577

DIP PROCESS FOR COLORING CADMIUM

Jesse Edwin Stareck, Birmingham, Mich., assignor to United Chromium, Incorporated, New York, N. Y., a corporation of Delaware No Drawing. Application August 10, 1948, Serial No. 43,532

3 Claims. (Cl. 148—6.2)

This invention relates to dip processes for coloring cadmium, and provides improvements therein.

This application is a continuation-in-part of my application Serial No. 588,423, filed April 14, 1945, now Patent 2,483,510, October 4, 1949.

Black, adherent, corrosion resistant, surface conversion coatings on cadmium, obtainable by dipping treatment are greatly desired by industry. Coatings heretofore produced by dipping methods have generally lacked adherence, do not have good corrosion resistance and do not have as deep and lively a black color as desired.

The present invention provides a novel process for producing deep tone black surface conversion coatings on cadmium, having good luster, superior corrosion resistance and good adherence. The coatings do not peel or flake when the metal on which the coating is applied is sharply bent, and will withstand piercing and forming operations. The invention provides the only known process for directly producing black surface conversion coatings on cadmium which have good corrosion resistance. The invention further provides a process which acts with good speed to produce the surface conversion coating.

According to the present invention the dip solution and composition used in the process consists essentially of a chromate radical from hexavalent chromium compounds, an auxiliary or activating acid radical and silver ion. Other compounds may be included in the solution and composition for special purposes.

Various chromate solutions for forming surface conversion coatings on cadmium are known, and tests with numbers of these solutions to which a soluble silver salt was added showed that the benefits of the present invention are obtained. A common characteristic of these prior art chromate dip solutions is that they contain hexavalent chromium radicals, obtained from dissolving chromates, dichromates and chromic acid, and mixtures thereof, and an auxiliary or activating acid radical.

Chloride radicals should not be used as an auxiliary acid radical in the present invention, and the presence of chlorides should be excluded or held to a very small amount, as it forms a very insoluble compound with silver and the nitrate radical except in small amounts is undesirable.

Silver ion may be obtained by dissolving any of the silver compounds except the most insoluble. In the presence of a large amount of chromate, silver will form silver chromate, which has limited solubility, on the order of a few tenths of a gram per liter. Ordinarily silver nitrate is used as being the most available, but many other compounds of silver may also be used, such as, for example, the acetate, sulphate, carbonate, citrate, silicofluoride, tartrate, tungstate, and oxide. The silver compound is usually added in an amount in excess of that corresponding to the amount of silver ion which will remain in the chromate solution; in this way precipitation by small amounts of chlorides in the solution will be compensated and also an automatic source for replenishment of silver ions lost in the process is provided.

According to my view the silver ion in the dip solution increases the tendency of the cadmium to go into solution, i. e., to react with the chromate ions of the solution and thereby form the surface conversion coating. Further, according to my view, the surface metal, in the presence of the dip solution, acts to reduce some of the hexavalent chromium to trivalent chromium, and these different constituents react on one another to form on the surface of the metal, black basic chromium chromate $(Cr(OH)_2)_2CrO_4$.

The composition used in the process of the present invention consists essentially of the ingredients making up any known chromate dip solution for forming surface conversion coatings on cadmium with the addition of a relatively small amount of a soluble silver compound.

The preferred composition consists essentially of a water soluble hexavalent chromium compound (as chromic acid, or a soluble chromate or dichromate), and a compound which dissolves in water to yield an auxiliary or activating acid radical (as a sulphate, or a fluoride) with the addition of a relatively small amount of water soluble silver compound.

An example of the preferred composition, giving the optimum and ranges of the ingredients, follows:

EXAMPLE I

| | Per Cent by Weight | | Concentration in Solution, g./l. | |
|---|---|---|---|---|
| | Optimum | Range | Optimum | Range |
| $Cr^{VI}$ | 16.5 | 8–24 | 30 | 15– 45 |
| $SO_4$ | 42.7 | 20–55 | 78 | 40–100 |
| $Ag^+$ | 0.3 | 0.02–0.7 | few tenths g./l. | few tenths g./l. |

The pH range is 1.0 to 3.0 (optimum 1.4 to 2.5).

*Typical make-up ingredients (per cent by weight)*

|  | Optimum | Range |
|---|---|---|
| $CrO_3$ | 22.1 | 11–33 |
| $Na_2Cr_2O_7 \cdot 2H_2O$ | 14.1 | 7–21 |
| $Na_2SO_4$ | 63.3 | 30–80 |
| $AgNO_3$ | 0.5 | 0.03–1.0 |

EXAMPLE II

|  | Per Cent by Weight | | Concentration in Solution, g./l. | |
|---|---|---|---|---|
|  | Optimum | Range | Optimum | Range |
| $Cr^{VI}$ | 16.5 | 8–24 | 30 | 15–45 |
| $F^-$ | 42.7 | 20–55 | 78 | 40–100 |
| $Ag^+$ | 0.3 | 0.02–0.7 | few tenths g./l | few tenths g./l. |

*Typical make-up ingredients (per cent by weight)*

|  | Optimum | Range |
|---|---|---|
| $CrO_3$ | 16.8 | 8–25 |
| $Na_2Cr_2O_7 \cdot 2H_2O$ | 10.8 | 5–20 |
| $NaF$ | 72.0 | 30–80 |
| $AgNO_3$ | 0.4 | 0.03–1.0 |

The dip is usually made by adding water to 1 to 3 pounds of the aforesaid compositions to make a gallon of solution.

Temperature has an effect on the potential of the metal on which the surface conversion coating is being formed, in contact with the solution, increasing temperature making the metal more active. Good results are obtained with cold or warm solutions.

Articles are immersed until the coating has developed over the surface thereof; ordinarily the time of immersion is from ½ to 5 minutes. After immersion, the coated articles are rinsed in water and dried in a suitable manner, as by hot water, warm air, or centrifuging.

What is claimed is:

1. A method of forming black surface conversion coatings on cadmium consisting in dipping the cadmium in a water solution consisting essentially of a hexavalent chromium compound of the group consisting of chromic acid, an alkali-metal chromate, and an alkali-metal dichromate, a water soluble acid or salt containing an activating or auxiliary acid radical of the group consisting of sulphate radicals and fluoride radicals, and a water soluble silver compound, the amounts by weight being: $Cr^{VI}$ of the hexavalent chromium compound —15 to 45 g./l., activating acid radical of the compound containing it —40 to 100 g./l., and silver of the silver compound—few tenths of a g./l., and then removing the cadmium from the solution.

2. A method of forming black surface conversion coatings on cadmium, according to claim 1, wherein the solution has a pH from 1.0 to 3.

3. A method of forming black surface conversion coatings on cadmium, according to claim 1, wherein the solution has a pH from 1.4 to 2.5.

JESSE EDWIN STARECK.

REFERENCES CITED

The following references are of record in the file of this patent:

UNITED STATES PATENTS

| Number | Name | Date |
|---|---|---|
| 1,782,092 | Gray et al. | Nov. 18, 1930 |
| 2,106,904 | Wilhelm | Feb. 1, 1938 |
| 2,288,007 | Lum | June 30, 1942 |
| 2,483,510 | Stareck | Oct. 4, 1949 |